United States Patent
Shikama (10) Patent No.: US 11,828,956 B2
(45) Date of Patent: Nov. 28, 2023

(54) CAMERA DEVICE AND PORTABLE ELECTRONIC DEVICE

(71) Applicant: AAC Optics (Suzhou) Co., Ltd., Suzhou (CN)

(72) Inventor: Kazuo Shikama, Osaka (JP)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 17/741,488

(22) Filed: May 11, 2022

(65) Prior Publication Data
US 2023/0314829 A1 Oct. 5, 2023

(30) Foreign Application Priority Data
Mar. 31, 2022 (JP) ................... 2022-059568

(51) Int. Cl.
- *G02B 27/64* (2006.01)
- *G02B 7/02* (2021.01)
- *H04N 23/51* (2023.01)
- *H04N 23/54* (2023.01)
- *H04N 23/55* (2023.01)

(52) U.S. Cl.
CPC ........... *G02B 27/646* (2013.01); *G02B 7/022* (2013.01); *H04N 23/51* (2023.01); *H04N 23/54* (2023.01); *H04N 23/55* (2023.01)

(58) Field of Classification Search
CPC ...... G02B 27/646; G02B 7/022; H04N 23/51; H04N 23/54; H04N 23/55
See application file for complete search history.

(56) References Cited

U.S. PATENT DOCUMENTS

| | | | | |
|---|---|---|---|---|
| 2020/0014850 | A1* | 1/2020 | Zhang | G02B 27/646 |
| 2020/0137271 | A1* | 4/2020 | Sugino | H04N 23/57 |
| 2021/0306545 | A1* | 9/2021 | Urakami | H04N 23/687 |
| 2022/0091398 | A1* | 3/2022 | Smyth | H04N 23/687 |
| 2022/0091430 | A1* | 3/2022 | Xu | G02B 7/023 |
| 2022/0155651 | A1* | 5/2022 | Park | G01S 7/4816 |

FOREIGN PATENT DOCUMENTS

JP    2017207785 A    11/2017

* cited by examiner

*Primary Examiner* — Amy R Hsu
(74) *Attorney, Agent, or Firm* — W&G Law Group (57) ABSTRACT

Provided is a camera device, including a housing having an accommodating cavity; a lens placed in the accommodating cavity; and an anti-shake mechanism placed in the accommodating cavity and including a first movable part, a first fixing part, a first coil, a first magnet, a filter, and a photosensitive sensor. The first coil, the filter and the photosensitive sensor are fixed to the first movable part. The first magnet is fixed to the first fixing part, and the first magnet and the first coil are spaced apart from each other to drive the first movable part to reciprocate inn a plane orthogonal to an optical axis direction. Compared with the related art, low-height and miniaturization of the camera device can be achieved, the components are simplified and the size is reduced, the occupied space of the components is reduced and the quality of the camera image is improved.

10 Claims, 8 Drawing Sheets

CAMERA DEVICE AND PORTABLE ELECTRONIC DEVICE

TECHNICAL FIELD

The present disclosure relates to the technical field of camera devices, in particular to a camera device and a portable electronic device.

BACKGROUND

With the rapid development of photographing technology, camera devices including lenses are widely used in many various portable electronic devices, such as portable phones, tablet computers, and the like.

In general, a camera device applied to a portable electronic device basically includes an auto-focus mechanism that adjusts the focus in an optical axis direction, and a camera shake correction mechanism driven to move in a plane orthogonal to the optical axis direction.

The auto-focus function is formed by a coil and a magnet, and the coil is fixed to an outer periphery of a lens carrier. When a current is applied to the coil, the coil moves the lens carrier along the optical axis direction of the lens under action of an electromagnetic force, thereby enabling focusing.

In addition, when the user takes an image while holding the electronic device by hand, the camera shake caused by the hand can be corrected by driving the lens in a direction perpendicular to the optical axis.

However, as a small device mounted on a portable electronic device, for example, a camera shake correction mechanism in an optical system such as a medium-telephoto lens with a long total optical length has problems such as a large length of driving amount and a large weight of the lens, which makes it difficult to achieve a low height and miniaturized structure.

In addition, since the auto-focus mechanism for adjusting the focus that is driven in the optical axis direction and the camera shake correction mechanism driven in a plane orthogonal to the optical axis are integrated, it is also necessary to configure a mechanism for suppressing natural vibrations and configure a centering adjustment mechanism of the lens, etc. As a result, assembling tends to be difficult and has poor structural stability.

In the related art, an infrared cut-off filter (IRCF) frame is only equipped with the IRCF, which is provided separately from an optical image stabilization (OIS) driving frame, and a tilt error is easily generated between the IRCF frame and the sensor.

SUMMARY

The purpose of the present disclosure is to provide a camera device and a portable electronic device to solve the technical problems in the related art, which can simplify the components and reduce the occupied space, and can reduce the tilt error of the sensor at the same time.

The present disclosure provides a camera device, which includes a housing having an accommodating cavity; a lens placed in the accommodating cavity; and an anti-shake mechanism placed in the accommodating cavity and including a first movable part, a first fixing part, a first coil, a first magnet, a filter, and a photosensitive sensor. The first coil, the filter and the photosensitive sensor are fixed to the first movable part. The first magnet is fixed to the first fixing part, and the first magnet and the first coil are spaced apart from each other to drive the first movable part to reciprocate inn a plane orthogonal to an optical axis direction.

As an improvement, a first protrusion protrudes from a backlight side of the first movable part in the optical axis direction, and a first groove is recessed on one end surface of the first protrusion away from the first movable part. A second groove is recessed on a light-receiving side of the first fixing part in the optical axis direction, and the second groove corresponds to the first groove. The photosensitive sensor is fixed on the first protrusion, one end of the photosensitive sensor extends into the first groove, and the other end of the photosensitive sensor extends into the second groove.

As an improvement, a stepped groove penetrates through a light-receiving side of the first movable part in the optical axis direction, and the stepped groove corresponds to the first groove and penetrates to communicate with the first groove, the filter is fixed in the stepped groove, and the filter and the photosensitive sensor are spaced apart from each other along the optical axis direction.

As an improvement, the first movable part is arranged on a light-receiving side of the first fixing part in the optical axis direction. The first coil is fixed on one side of the first movable part facing the first fixing part, and the first coil is arranged around the photosensitive sensor. The first magnet is fixed on one side of the first fixing part facing the first movable part, and the first magnet corresponds to the first coil.

As an improvement, a third groove is recessed on a backlight side of the first movable part in the optical axis direction, a yoke is fixed in the third groove, and the yoke corresponds to the first coil.

As an improvement, a second protrusion protrudes from a backlight side the first movable part in the optical axis direction, and a fourth groove is recessed on one end surface of the second protrusion away from the first movable part, and a first plate is placed in the fourth groove. A fifth groove is recessed on a light-receiving side of the first fixing part in the optical axis direction, the fifth groove corresponds to the fourth groove, and a second plate is placed in the fifth groove. A ball is arranged between the first plate and the second plate, and one end of the ball close to the first movable part extends into the fourth groove and is in a rolling connection with the first plate, one end of the ball close to the first fixing part extends into the fifth groove and is in a rolling connection with the second plate, so that the first movable part reciprocates in a plane orthogonal to the optical axis direction.

As an improvement, at least part of the housing is made of a metal material, a heat conduction member is provided in the accommodating cavity, and the heat conduction member is in contact with the photosensitive sensor and the housing, so as to conduct heat of the photosensitive sensor to the housing.

As an improvement, an auto-focus mechanism for driving the lens to perform auto-focusing is provided in the accommodating cavity, and the auto-focus mechanism includes a second movable part, a second fixing part, a second coil, and a second magnet. The lens and the second coil are fixed to the second movable part, and the second magnet is fixed to the second fixing part. The second magnet and the second coil are spaced apart from each other to drive the second movable part to reciprocate along the optical axis direction.

As an improvement, the lens is a zoom lens.

As an improvement, the lens is a periscope lens.

The present disclosure also provides a portable electronic device including the aforementioned camera device.

Compared with the related art, by fixing the first coil, the filter and the photosensitive sensor on the first movable part, low-height and miniaturization of the camera device can be achieved, the components are simplified and the size is reduced, the occupied space of the components is reduced and the quality of the camera image is improved.

REFERENCE SIGNS

10—camera device;
20—portable electronic device;
100—housing, 100a—accommodating cavity, 101—top wall, 102—bottom wall, 103—peripheral wall, 104—through hole;
200—lens;
300—anti-shake mechanism, 301—first movable part, 3011—first protrusion, 3012—first groove, 3013—stepped groove, 3014—third groove, 3015—second protrusion, 3016—fourth groove, 3017—third protrusion, 302—first fixing part, 3021—second groove, 3022—fifth groove, 303—filter, 304—photosensitive sensor, 305—yoke, 306—first coil, 307—first magnet, 308—first flexible substrate, 309—heat conduction member, 310—first position detection element, 311—first shock-proof buffer, 312—first plate, 313—second plate, 314—ball;
400—auto-focus mechanism, 401—second movable part, 402—second fixing part, 403—second coil, 404—second magnet, 405—elastic support part, 4051—upper leaf spring, 4052—lower leaf spring, 406—second position detection element, 407—second flexible substrate, 408—second shock-proof buffer;
500—optical axis;
60—zoom lens structure, 600—zoom lens;
70—periscope lens structure, 700—periscope lens.

DESCRIPTION OF EMBODIMENTS

Embodiments described below with reference to the accompanying drawings are exemplary and are only used to explain the present disclosure, but not to be construed as limitations to the present disclosure.

As shown in FIG. 1 to FIG. 10, an embodiment of the present disclosure provides a camera device 10, which includes a housing 100 having an accommodation cavity 100a, a lens 200 and an anti-shake mechanism 300 placed in the accommodation cavity 100a. The lens 200 and the anti-shake mechanisms 300 are arranged in sequence along the direction of the optical axis 500, and the lens 200 is located on a light-receiving side in the direction of the optical axis 500.

The housing 100 includes a top wall 101, a bottom wall 102 and a peripheral wall 103. The peripheral wall 103 is connected to the top wall 101 and the bottom wall 102. The top wall 101, the bottom wall 102 and the peripheral wall 103 surround to form a accommodating cavity 100a. A through hole 104 communicated with the accommodating cavity 100a is formed on the top wall 101 for at least part of the lens 200 to protrude therefrom.

The anti-shake mechanism 300 includes a first movable part 301, a first fixing part 302, a first coil 306, a first magnet 307, a filter 303 and a photosensitive sensor 304. The first fixing part 302 is fixed in the accommodating cavity 100a, and the first movable part 301 is movably arranged in the accommodating cavity 100a. The first movable part 301 can move in a plane orthogonal to the direction of the optical axis 500. The first magnet 307 is fixed on the first fixing part 302, and the first coil 306, the filter 303 and the photosensitive sensor 304 are fixed to the first movable part 301. The filter 303 is closer to the light-receiving side in the direction of the optical axis 500 than the photosensitive sensor 304. In some embodiments, the filter 303 is an infrared cut-off filter 303, which generally protects the photosensitive sensor 304 and blocks light of certain wavelengths, thereby filtering out unwanted light and passing only visible light.

The first coil 306, the filter 303, and the signal lines and power lines of the photosensitive sensor 304 can be arranged outside the anti-shake mechanism 300 through the first flexible substrate 308, so as not to block the operation of the anti-shake mechanism 300. Optionally, a space for free movement is provided in the accommodating cavity 100a, so that at least when a curved surface of the first flexible substrate 308 moves in a plane, it will not block the movement of the anti-shake mechanism 300.

The working principle of the above-mentioned anti-shake mechanism 300 is as follows: when the first coil 306 is energized, through the interaction between the magnetic field of the first magnet 307 and the current flowing in the first coil 306, a Lorentz force is generated in the first coil 306. The direction of the Lorentz force is a direction orthogonal to the direction of the magnetic field of the first magnet 307 and to the direction of the current flowing in the first coil 306. Since the first magnet 307 is fixed, a reaction force acts on the first coil 306. This reaction force becomes the driving force of the first movable part 301, and the first movable part 301 having the first coil 306 moves in a plane orthogonal to the direction of the optical axis 500, thereby performing anti-shake correction.

In this embodiment, the anti-shake mechanism 300 uses the first movable part 301 to move the filter 303 and the photosensitive sensor 304 in a plane orthogonal to the optical axis 500 to perform hand-shake correction and, at the same time, the first coil 306, the filter 303 and the photosensitive sensor 304 are fixed to the first movable part 301, thereby realizing the low height and miniaturization of the camera device 10, simplifying the components and reducing the occupied space, and also reducing the inclination error of the sensor, thereby improving the quality of the camera image.

Figure 7:
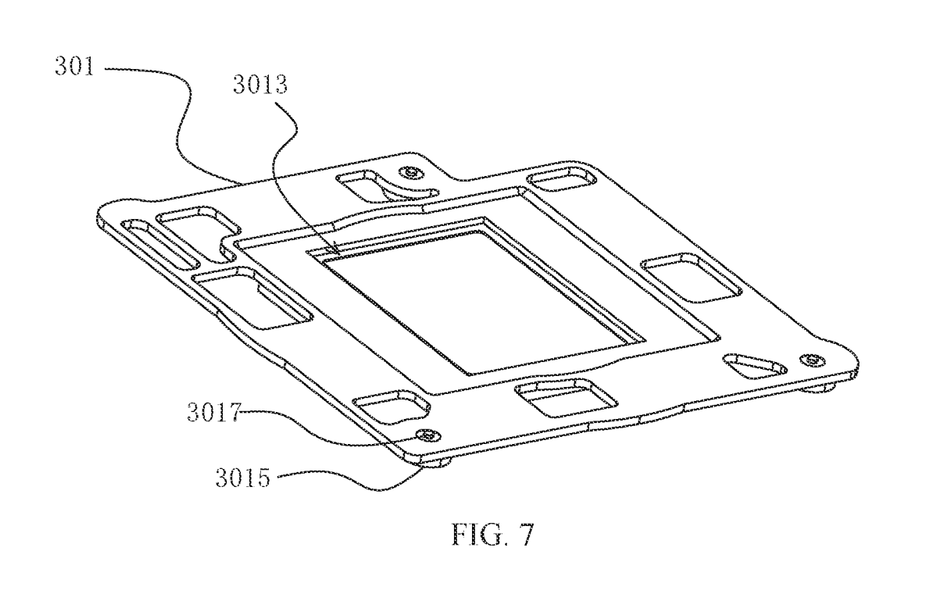
FIG. 7 is a perspective view of a first movable part of a camera device according to an embodiment of the present disclosure.
Figure 8:
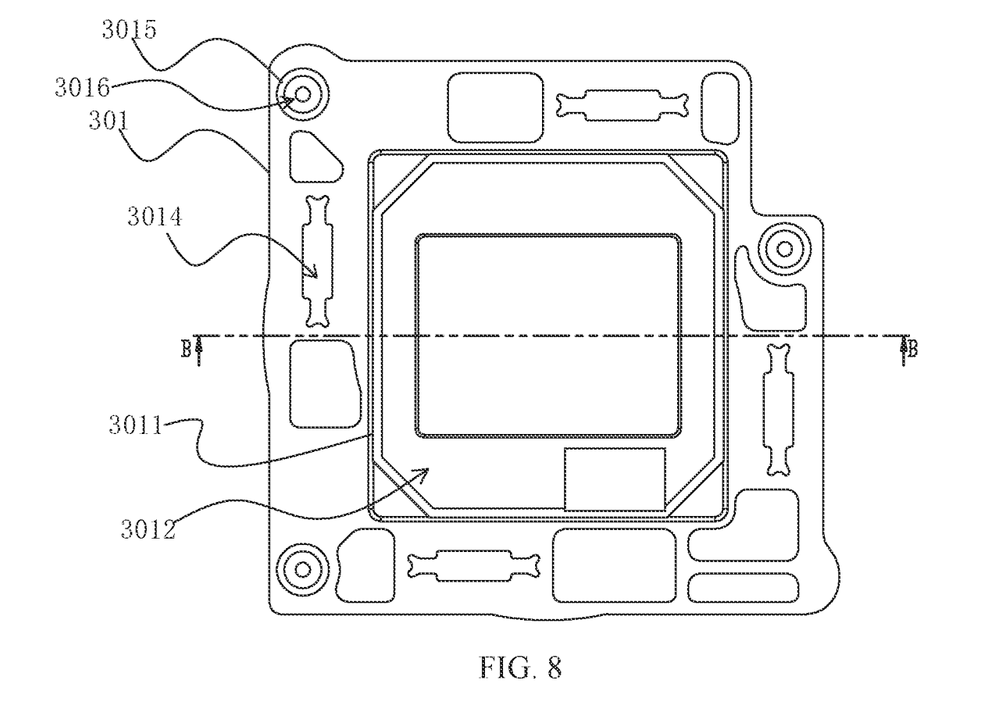
FIG. 8 is another schematic diagram of a first movable part of a camera device according to an embodiment of the present disclosure.
Figure 9:
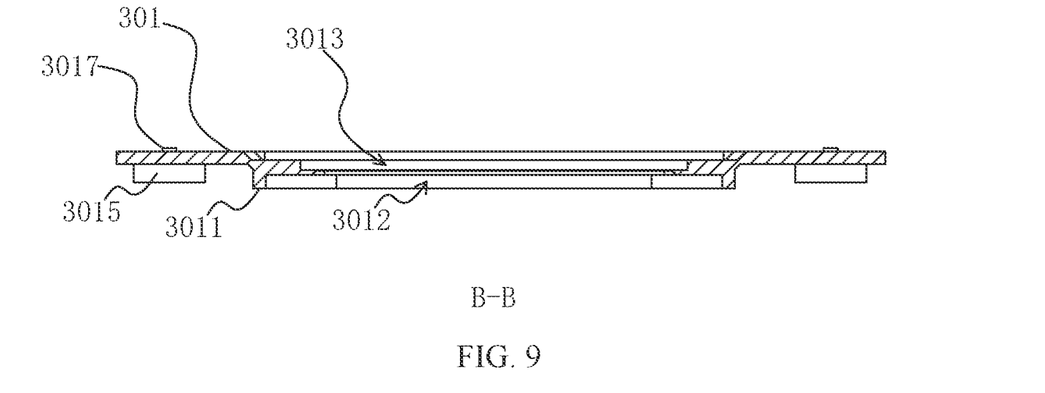
FIG. 9 is a sectional view along BB direction of FIG. 8.

Further, as shown in FIGS. 7 to 9, in some embodiments, the main body of the first movable part 301 is a plate-like structure. A first protrusion 3011 protrudes from the main body of the first movable part 301 at the backlight side in the direction of the optical axis 500. The first protrusion 3011 is optionally located in the middle of the first movable part 301. The photosensitive sensor 304 is fixed on the first protrusion 3011 and can move synchronously with the movement of the first movable part 301. A first groove 3012 is recessed on the end surface of the protrusion 3011 away from the first movable part 301. The first groove 3012 is configured to accommodate a partial structure of the photosensitive sensor 304, so that one end of the photosensitive sensor 304 extends into the first groove 3012. Therefore, the space occupied by the photosensitive sensor 304 in the direction of the optical axis 500 can be further compressed and, at the same time, the photosensitive sensor 304 can be protected. The shape and size of the first groove 3012 can be determined according to the shape and size of the photosensitive sensor 304, which is not limited herein.

A second groove 3021 is recessed on the light-receiving side of the first fixing part 302 in the direction of the optical axis 500. The second groove 3021 corresponds to the first groove 3012. The second groove 3021 is configured to accommodate a partial structure of the, so that one end of the photosensitive sensor 304 extends into the second groove 3021. As a result, the space occupied by the photosensitive sensor 304 in the direction of the optical axis 500 can be further compressed and, at the same time, the photosensitive sensor 304 can be protected. The shape and size of the second groove 3021 can be determined according to the shape and size of the photosensitive sensor 304, which is not limited herein. Those skilled in the art can know that the inner diameter of the second groove 3021 is larger than the size of the photosensitive sensor 304 that extends into the second groove 3021, so as to prevent the lateral movement of the photosensitive sensor 304 in the second groove 3021 from being blocked, and prevent the inner wall of the second groove 3021 from limiting the movement of the photosensitive sensor 304.

By accommodating the photosensitive sensor 304 in the first groove 3012 and the second groove 3021, the projection of the photosensitive sensor 304 in the direction of the optical axis 500 overlaps the first movable part 301 and the first fixing part 302. The thicknesses of the first movable part 301, the first fixing part 302 and the photosensitive sensor 304 are overlapped, thereby reducing the space occupied by the anti-shake mechanism 300, which is beneficial to the miniaturization of the camera device 10, and can efficiently reduce of components in the structure and reduce the tilt error of the photosensitive sensor 304 relative to the optical axis 500, thereby further improving the installation accuracy of the photosensitive sensor 304, improving the overall rigidity of the photosensitive sensor 304, and improving the stability of the camera device 10 against drop shocks.

Further, as shown in FIGS. 7 to 9, a stepped groove 3013 penetrates through the light-receiving side of the first movable part 301 in the direction of the optical axis 500. The stepped groove 3013 corresponds to the first groove 3012 and penetrates to communicate with the first groove 3012. The filter 303 is fixed in the stepped groove 3013. The filter 303 and the photosensitive sensor 304 are spaced along the direction of the optical axis 500. The filter 303 is closer to the light-receiving side in the direction of the optical axis 500. A projection of the filter 303 in the direction of the optical axis 500 overlaps the first movable part 301. By overlapping the thicknesses, the space occupied by the anti-shake mechanism 300 is reduced, which is beneficial to the miniaturization of the camera device 10, and can efficiently reduce of components in the structure and reduce the tilt error of the filter 303 relative to the optical axis 500, thereby further improving the installation accuracy of the filter 303, improving the overall rigidity of the filter 303, and improving the stability of the camera device 10 against drop shocks.

Figure 5:
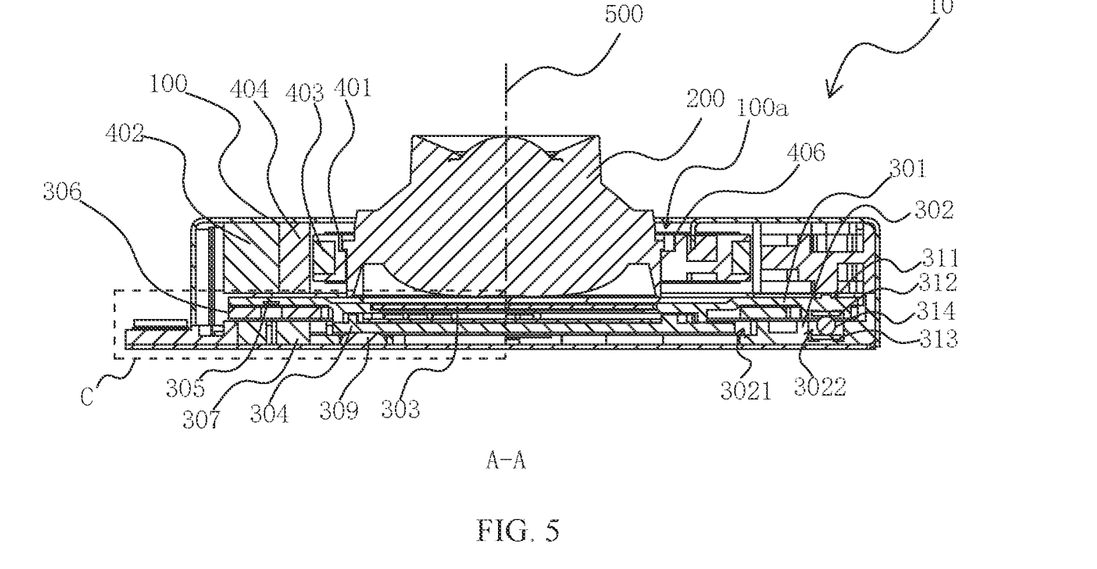
FIG. 5 is sectional view along AA direction of FIG. 4.
Figure 6:
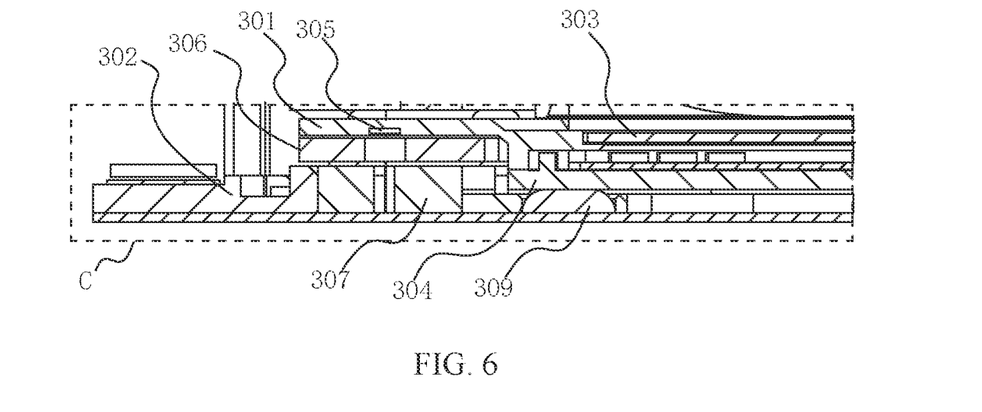
FIG. 6 is an enlarged structural view at part C of FIG. 5.

Further, as shown in FIGS. 5 and 6, the first movable part 301 is provided on the light-receiving side of the first fixing part 302 in the direction of the optical axis 500. The first coil 306 is fixed on one side of the first movable part 301 facing the fixing part 302, and the first coil 306 is arranged around the photo sensor 304. The first magnet 307 is fixed on one side of the first fixing part 302 facing the first movable part 301, and the first magnet 307 corresponds to the first coil 306. In some embodiments, there are multiple first magnets 307 and multiple first coils 306, and the multiple first magnets 307 and the multiple first coils 306 are in one-to-one correspondence. Optionally, there are four coils 306, and the four first coils 306 are arranged at equal intervals with the photosensitive sensor 304 as the center. Those skilled in the art can understand that the number and distribution of the first coils 306 can be determined according to the actual situation, which is not limited herein.

Further, referring to FIG. 5, FIG. 6 and FIG. 7, a third groove 3014 is recessed on the backlight side of the first movable part 301 in the direction of the optical axis 500, and a yoke 305 is fixed in the third groove 3014. The yoke 305 one-to-one corresponds to the first coil 306. The yoke 305 is disposed in the third groove 3014, so that the surface of the yoke 305 is lower than the surface of the first movable part 301, which is also beneficial to the miniaturization of the camera device 10.

The yoke 305 is attached to the first movable part 301, and has a magnetic spring effect that always pulls the anti-vibration mechanism 300 toward the center of the optical axis 500 through the yoke 305 and the first magnet 307, so as to effectively eliminate looseness. As a result, the inclination of the first movable part 301 with respect to the optical axis 500 can be reduced. In addition, since the first coil 306, the first magnet 307 and the yoke 305 can eliminate looseness and apply force, no additional member for applying force is required, which contributes to a significant reduction in number of components, and facilitates miniaturization and ease of assembly.

Further, as shown in FIGS. 5 to 9, a second protrusion 3015 protrudes from the backlight side the first movable part 301 in the direction of the optical axis 500, and a fourth groove 3016 is recessed on one end surface of the second protrusion 3015 away from the first movable part 301. A first plate 312 is disposed in the fourth groove 3016, and the first plate 312 is fixed on the bottom surface of the fourth groove 3016.

A fifth groove 3022 is recessed on the light-receiving side of the first fixing part 302 in the direction of the optical axis 500. The fifth groove 3022 one-to-one corresponds to the fourth groove 3016. A second plate 313 disposed in the fifth groove 3022, and the second plate 313 is fixed to the bottom surface of the fifth groove 3022.

A ball 314 is arranged between the first plate 312 and the second plate 313, and multiple first plates 312, multiple second plates 313 and multiple balls 314 are provided. The multiple first plate 312, the multiple second plates 313 and the multiple balls 314 are in one-to-one correspondence, so as to provide a balanced and evenly distributed support force to prevent the first movable part 301 from tilting during movement. One end of the ball 314 close to the first movable part 301 extends into the fourth groove 3016 and is in rolling connection with the first plate 312, and one end of the ball 314 close to the first fixing part 302 extends into the fifth groove 3022 and is in rolling connection with the second plate 313, so that the first movable part 301 can reciprocate in a plane orthogonal to the direction of the optical axis 500.

By accommodating the ball 314 in the fourth groove 3016 and the fifth groove 3022, the movement of the ball 314 can be limited, so as to prevent the movement extent of the first movable part 301 from being excessive large and, at the same time, guarantee a projection of the ball 314 in the direction of the optical axis 500 to overlap the first movable part 301 and the first fixing part 302. The thicknesses of the first movable part 301, the first fixing part 302 and the ball 314 are overlapped, thereby reducing the occupied space of the ball 314, which is beneficial to the miniaturization of the camera device 10 and improve the protection effect against the impact of falling.

Further, as shown in FIG. 5, a third protrusion 3017 protrudes from the light-receiving side of the first movable part 301 in the direction of the optical axis 500, and a first shock-proof buffer 311 covers the third protrusion 3017. In an embodiment, multiple third protrusions 3017 are provided, and the multiple third protrusions 3017 are arranged on the first movable part 301 at annular intervals, so as to improve the balanced and dispersed buffering and supporting functions. Those skilled in the art can understand that, the number and distribution of the third protrusions 3017 can be determined according to the actual situation, which is not limited herein. The first shock-proof buffer 311 may be a shock-absorbing gel, which can have more accurate anti-shake function by producing shock-absorbing effect for the sudden power-on pulse control of the anti-shake mechanism 300.

Figure 1:
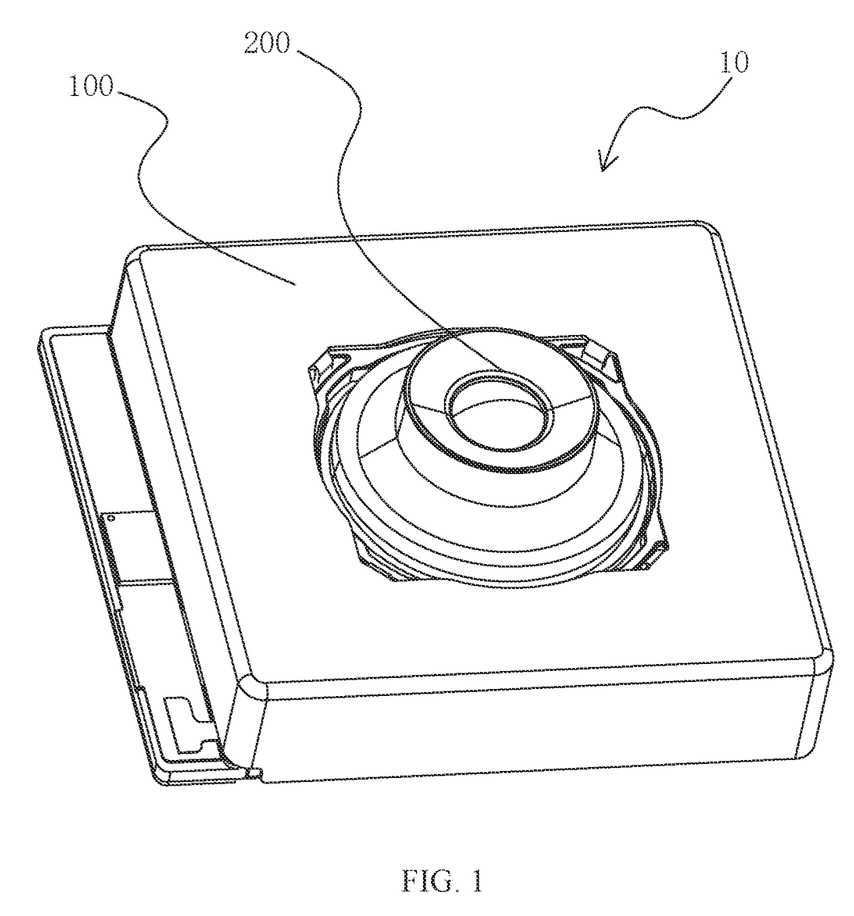
FIG. 1 is a perspective view of an overall structure of a camera device according to an embodiment of the present disclosure.
Figure 2:
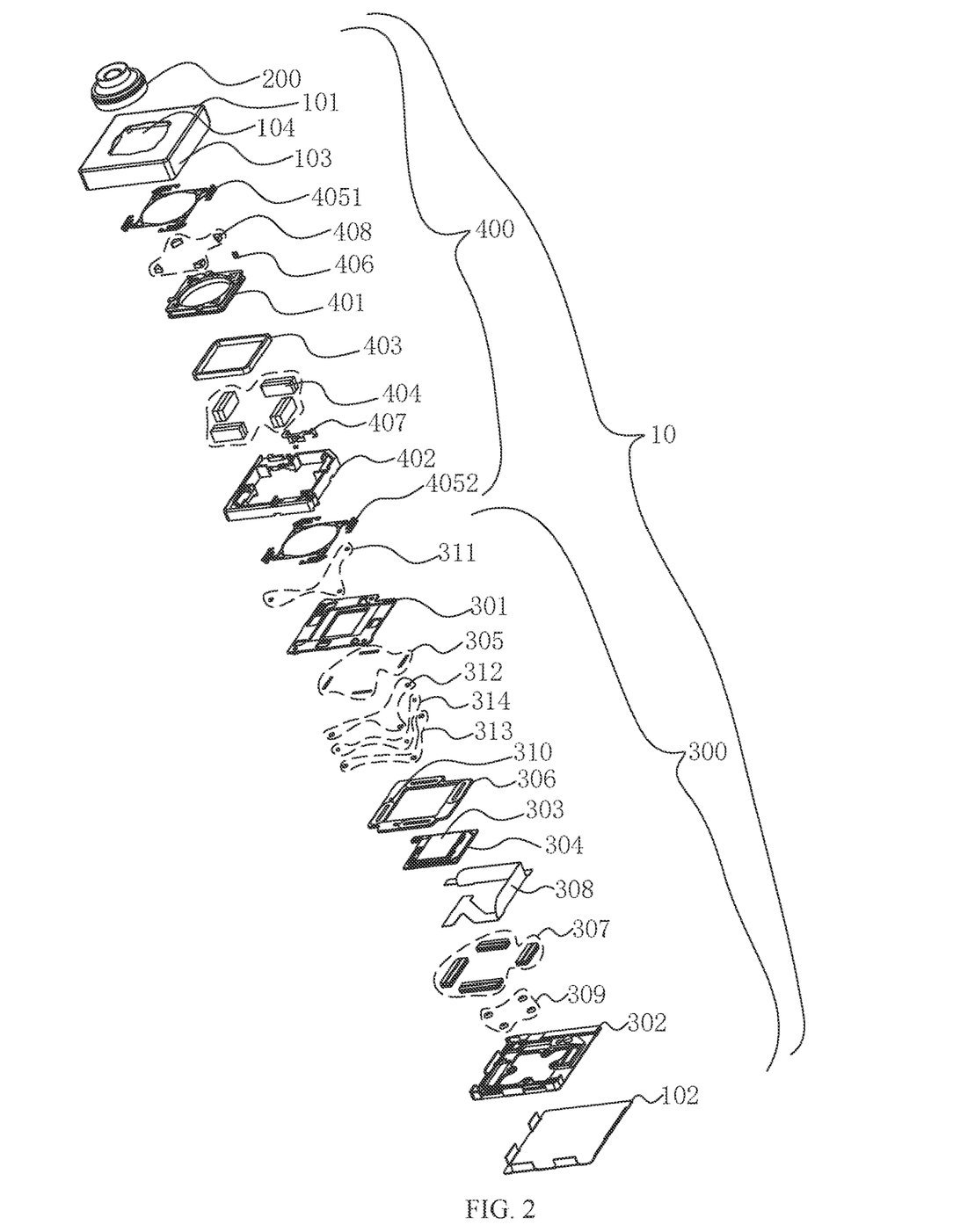
FIG. 2 is an exploded view of an overall structure of a camera device according to an embodiment of the present disclosure.
Figure 3:
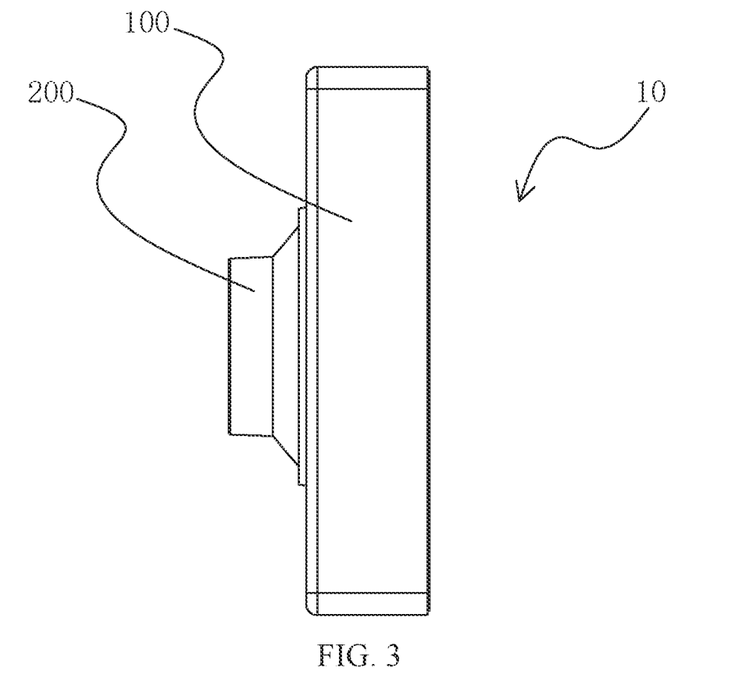
FIG. 3 is a side view of an overall structure of a camera device according to an embodiment of the present disclosure.
Figure 4:
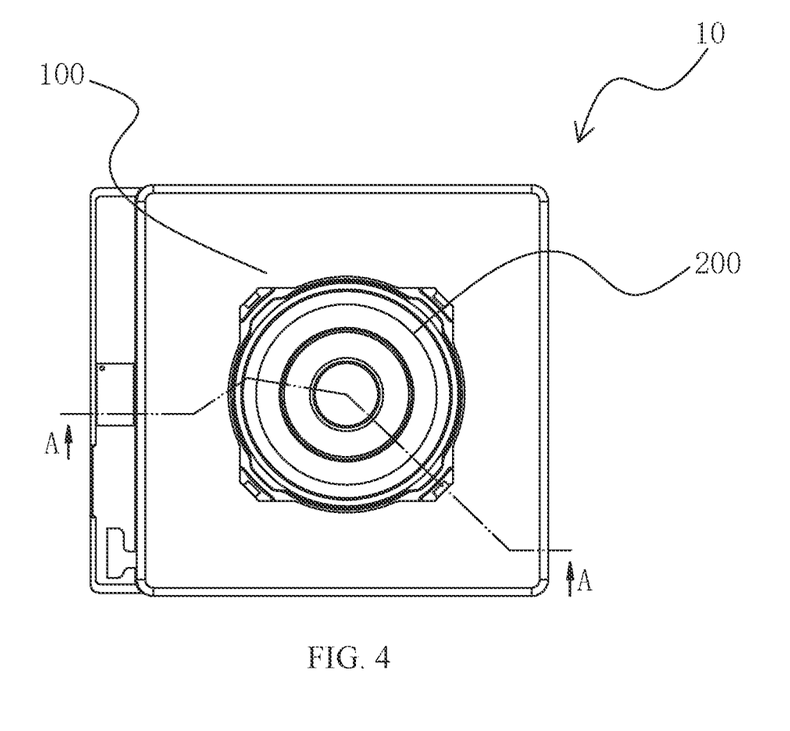
FIG. 4 is a top view of an overall structure of a camera device according to an embodiment of the present disclosure.

In some embodiments, as shown in FIG. 1, the first coil 306 is provided with a first position detection element 310 capable of detecting the magnetic flux of the first magnet 307. Optionally, at least two first position detection elements 310 are provided, by detecting the magnetic flux of the first magnet 307, it is possible to perform accurate position detection and anti-shake control for the first movable part 301.

According to the technical solutions of the above-mentioned embodiments, the purpose of realizing a more efficient anti-shake mechanism 300 in the miniaturized portable electronic device can be achieved, and the quality of the captured image can be improved.

Figure 10:
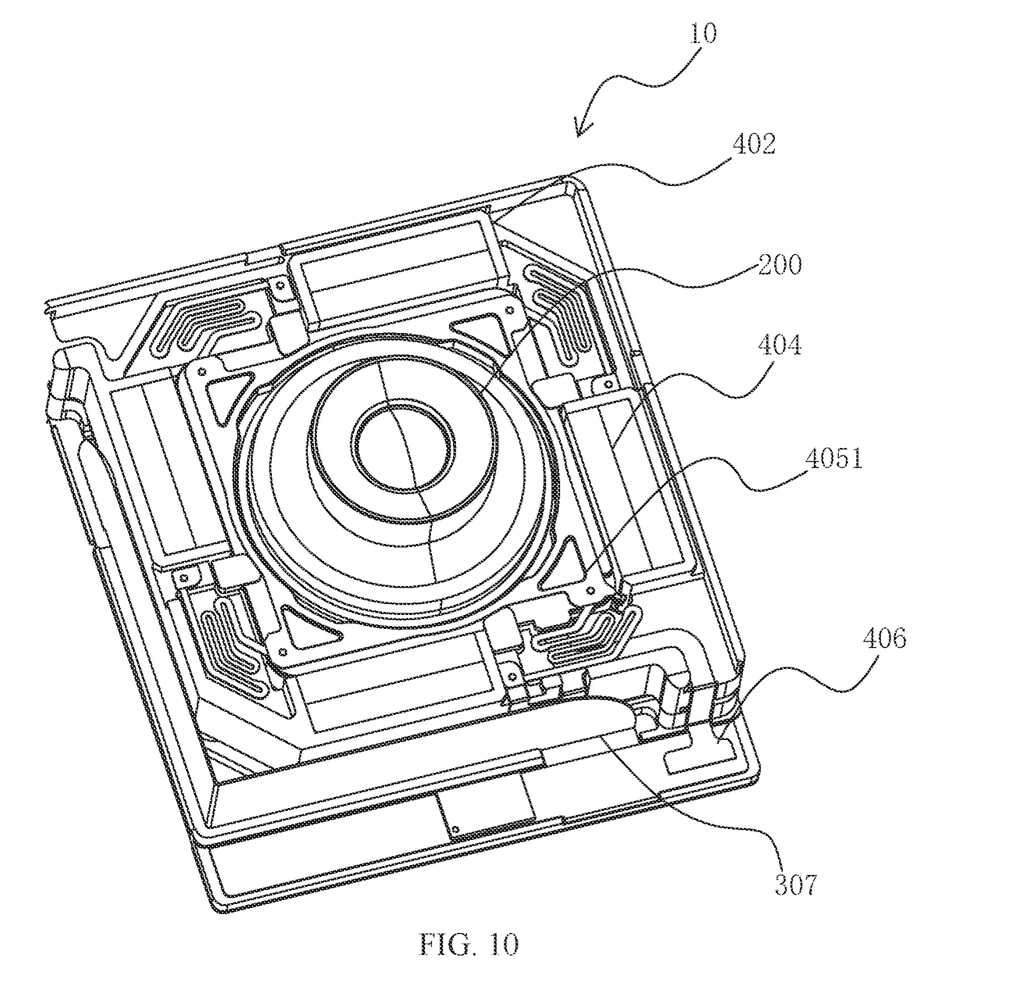
FIG. 10 is a perspective view of an overall structure of a camera device with a part of a housing hidden according to an embodiment of the present disclosure.

As shown in FIGS. 1, 5 and 10, an auto-focus mechanism 400 for driving the lens 200 to perform auto focus is provided in the housing cavity 100a, the components of the auto-focus mechanism 400 and the anti-shake mechanism 300 are separated and natural vibrations are suppressed. Therefore, the design difficulty is reduced and, at the same time, it is not necessary to move the lens 200 in three dimensions and, accordingly, the centering of the lens 200 becomes easy.

Further, the auto-focus mechanism 400 includes a second movable part 401, a second fixing part 402, a second coil 403 and a second magnet 404. The second movable part 401 can reciprocate along the direction of the optical axis 500, the lens 200 and the second coil 403 are connected to the second movable part 401.

A cylindrical through groove runs through the middle of the second movable part 401, the lens 200 is fixed on the inner circumferential surface of the through groove by bonding, screwing or other connection manners. The second coil 403 is an air-core coil that is energized during focusing, when observing along the direction of the optical axis 500, the second coil 403 is a polygon, such as a quadrilateral structure. The second coil 403 is wrapped around the outer wall surface of the second movable part 401, when observing along the direction of the optical axis 500, the second fixing part 402 is a square frame structure. The second movable part 401 extends into the frame of the second fixing part 402, the second magnet 404 is arranged on the inner wall surface of the second fixing part 402, and the second magnet 404 is arranged around the second coil 403. The first magnet 307, the first coil 306 and the second magnet 404 are arranged at intervals along the optical axis direction in sequence.

When the auto-focus mechanism 400 performs auto-focusing, the second coil 403 is energized. A Lorentz force is generated in the second coil 403 by the interaction between the magnetic field of the second magnet 404 and the current flowing in the second coil 403. The direction of the Lorentz force is a direction orthogonal to the direction of the magnetic field of the second magnet 404 and to the direction of the current flowing in the second coil 403. Since the second magnet 404 is fixed, a reaction force acts on the second coil 403. This reaction force becomes the driving force of the second movable part 401, and the second movable part 401 having the second coil 403 moves in the direction of the optical axis 500 to perform focusing.

As shown in FIGS. 1 and 10, the auto-focusing mechanism 400 further includes an elastic support part 405, and both ends of the elastic support part 405 are respectively connected with the second movable part 401 and the second fixing part 402, so as to suspended the second movable part 401 in the accommodating cavity 100a, and can maintain the lens 200, through their respective elasticity, in the suspended state without the application of electromagnetic force.

In some embodiments, the elastic support part 405 includes an upper leaf spring 4051 and a lower leaf spring 4052. The upper leaf spring 4051 is located on one side of the second movable part 401 close to the light-receiving side in the direction of the optical axis 500. The two ends of the upper leaf spring 4051 are respectively connected with the upper end surfaces of the second movable part 401 and the second fixing part 402. The upper end surfaces of the second movable part 401 and the second fixing part 402 are provided with several positioning protrusions, and the upper leaf spring 4051 is provided with corresponding positioning through grooves matching the positioning protrusion. Similarly, the lower leaf spring 4052 is located on one side of the second movable part 401 away from the light-receiving side in the direction of the optical axis 500, and the lower leaf spring 4052 is opposite to the upper leaf spring 4051. Two ends of the lower leaf spring 4052 are respectively connected with the lower end surfaces of the second movable part 401 and the second fixing part 402. The lower end surfaces of the second movable part 401 and the second fixing part 402 are provided with several positioning protrusions, and the lower leaf spring 4052 is provided with positioning through grooves matching with the positioning protrusions.

Further, as shown in FIG. 1, a second position detection element 406 capable of detecting the magnetic flux of the second magnet 404 is mounted in the second coil 403. By detecting the magnetic flux of the second magnet 404, position detection and focus control of the lens 200 can be accurately conducted.

As shown in FIGS. 1, 5 and 6, the signal lines and power lines of the second position detection element 406 can be arranged outside the auto-focus mechanism 400 through the second flexible substrate 407. Optionally, the second flexible substrate 407 and the first flexible substrate 308 are integrated, and when a driving integrated circuit is mounted on the first flexible substrate 308, energization of auto-focus, servo control for feedback of the signal of the second position detection element 406, and the like can be performed.

Further, as shown in FIG. 1, the second movable part 401 is provided with a second shock-proof buffer 408, and the second shock-proof buffer 408 may be a shock-absorbing gel, which can have more accurate anti-shake function by producing shock-absorbing effect for the sudden power-on pulse control.

In the related art, there is a further technical problem that is as the size of the imaging assembly increases, the heat generation increases. In the anti-shake mechanism 300 for shockproof of the camera assembly, the heat dissipation becomes a problem. There may be a case where the movement is restricted and the elements are damaged due to the heat generation of the imaging assembly itself. In order to solve the technical problem of heat dissipation of the imaging assembly, at least a part of the housing 100 is made of a metal material with high thermal conductivity, and this part is optionally arranged adjacent to the photosensitive sensor 304, for example, located on the bottom wall 102, or the bottom wall 102 is made of metal as a whole. The accommodation cavity 100a is provided with a thermal conductive member 309, and the thermal conductive member 309 is in contact with the photosensitive sensor 304 and the housing 100, to conduct the heat of the photosensitive sensor 304 to the housing 100.

Therefore, there is no need to adopt a new heat dissipation structure or use more components such as a fan for air circulation for heat dissipation, so this embodiment has the technical advantages of reducing damage of the photosensitive sensor 304, performing good heat dissipation effect, and achieving miniaturization.

In some embodiments, the thermal conductive member 309 is a heat dissipation gel, which can efficiently transfer the heat emitted from the photosensitive sensor 304 to the housing 100, and can achieve more accurate anti-shake function by producing shock-absorbing effect for the sudden power-on pulse control of the anti-shake mechanism 300. Those skilled in the art may understand that the thermal conductive member 309 also has other implementing manners, which are not listed herein.

Figure 11:
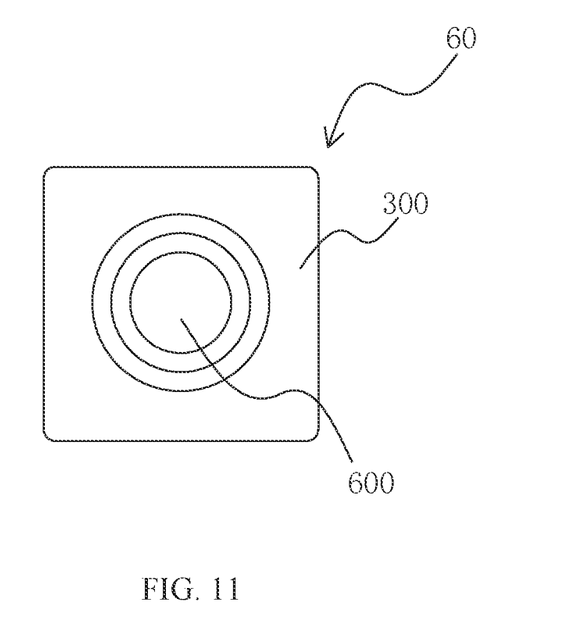
FIG. 11 is a schematic structural diagram of a zoom lens structure according to an embodiment of the present disclosure.
Figure 12:
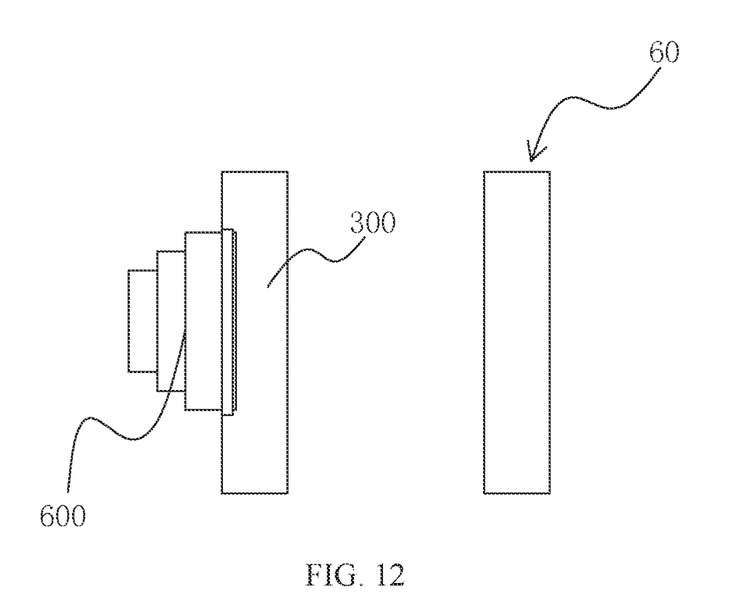
FIG. 12 is a schematic diagram showing lens zooming of a zoom lens structure according to an embodiment of the present disclosure.

The lens 200 in the foregoing embodiment is an auto-focus lens. In some embodiments, as shown in FIGS. 11 and 12, the above-mentioned anti-shake mechanism 300 can also be applied to a zoom lens structure 60. The zoom lens structure 60 includes a zoom lens 600, the zoom lens 600 includes at least two groups of lens pieces arranged at intervals along the optical axis direction, and the zoom lens structure 60 realizes zooming by changing the spacing of the two groups of lens pieces along the optical axis direction. For the telescopic movement, the left side of FIG. 12 is a side view when the zoom lens 600 stretches, and the right side is a side view when the zoom lens 600 retracts. By arranging the zoom lens structure 60, it is beneficial to improve the shooting effect of the camera device, and to improve the user's experience.

Figure 13:
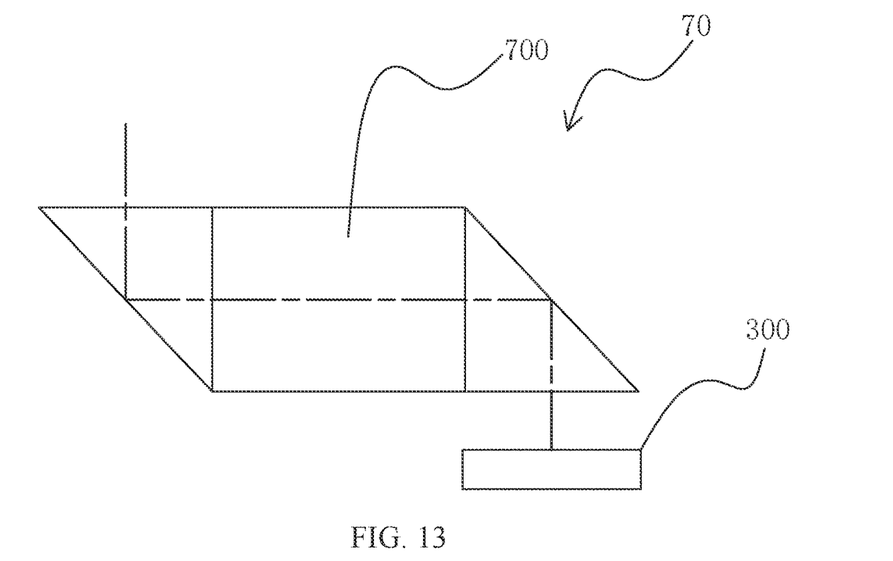
FIG. 13 is a schematic structural diagram of a periscope lens structure according to an embodiment of the present disclosure.

Referring to FIG. 13, the above-mentioned anti-shake mechanism 300 can also be applied to a periscope lens structure 70. The periscope lens structure 70 includes a periscope lens 700, and the periscope lens 700 includes at least one prism for changing the direction of the light path. By arranging a prism that changes the optical path, it is beneficial to reduce the volume of the camera device, thereby facilitating the realization of miniaturization and portability of the camera device.

Figure 14:
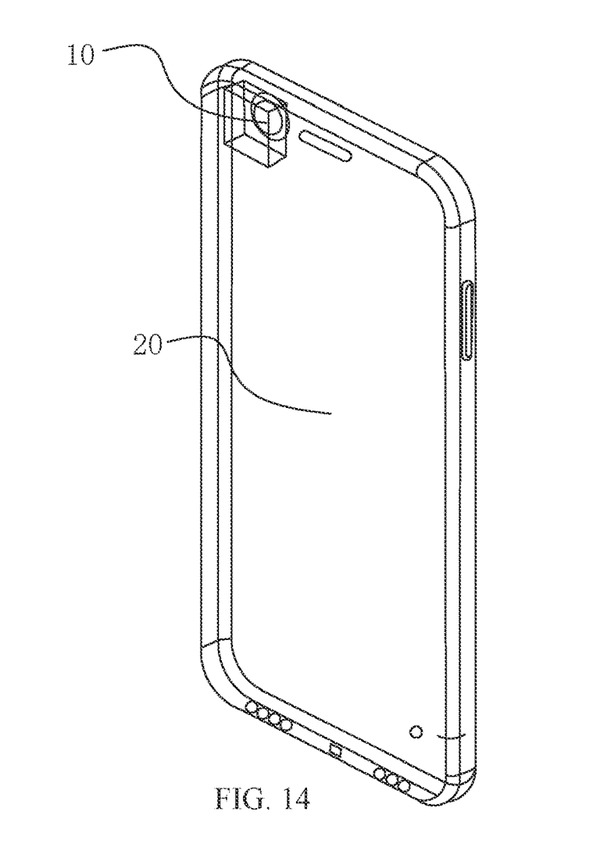
FIG. 14 is a perspective view of a portable electronic device according to an embodiment of the present disclosure.

Based on the above embodiments, referring to FIG. 14, the present disclosure further provides a portable electronic device 20, such as a smart phone or a tablet device, all including the aforementioned camera device 10.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:
1. A camera device, comprising:
a housing having an accommodating cavity;
a lens placed in the accommodating cavity; and
an anti-shake mechanism placed in the accommodating cavity and comprising a first movable part, a first fixing part, a first coil, a first magnet, a filter, and a photosensitive sensor,
wherein the first coil, the filter and the photosensitive sensor are fixed to the first movable part,
the first magnet is fixed to the first fixing part, and
the first magnet and the first coil are spaced apart from each other to drive the first movable part to reciprocate inn a plane orthogonal to an optical axis direction;
a first protrusion protrudes from a backlight side of the first movable part in the optical axis direction, and a first groove is recessed on one end surface of the first protrusion away from the first movable part,
a second groove is recessed on a light-receiving side of the first fixing part in the optical axis direction, and the second groove corresponds to the first groove, and
the photosensitive sensor is fixed on the first protrusion, one end of the photosensitive sensor extends into the first groove, and the other end of the photosensitive sensor extends into the second groove.

2. The camera device according to claim 1, wherein a stepped groove penetrates through a light-receiving side of the first movable part in the optical axis direction, and the stepped groove corresponds to the first groove and penetrates to communicate with the first groove, the filter is fixed in the stepped groove, and the filter and the photosensitive sensor are spaced apart from each other along the optical axis direction.

3. The camera device according to claim 1, wherein
the first movable part is arranged on a light-receiving side of the first fixing part in the optical axis direction,
the first coil is fixed on one side of the first movable part facing the first fixing part, and the first coil is arranged around the photosensitive sensor, and
the first magnet is fixed on one side of the first fixing part facing the first movable part, and the first magnet corresponds to the first coil.

4. The camera device according to claim 1, wherein a third groove is recessed on a backlight side of the first movable part in the optical axis direction, a yoke is fixed in the third groove, and the yoke corresponds to the first coil.

5. The camera device according to claim 1, wherein
a second protrusion protrudes from a backlight side the first movable part in the optical axis direction, and a fourth groove is recessed on one end surface of the second protrusion away from the first movable part, and a first plate is placed in the fourth groove,
a fifth groove is recessed on a light-receiving side of the first fixing part in the optical axis direction, the fifth groove corresponds to the fourth groove, and a second plate is placed in the fifth groove;
a ball is arranged between the first plate and the second plate, and one end of the ball close to the first movable part extends into the fourth groove and is in a rolling connection with the first plate, one end of the ball close to the first fixing part extends into the fifth groove and is in a rolling connection with the second plate, so that the first movable part reciprocates in a plane orthogonal to the optical axis direction.

6. The camera device according to claim 1, wherein at least part of the housing is made of a metal material, a heat conduction member is provided in the accommodating cavity, and the heat conduction member is in contact with the photosensitive sensor and the housing, so as to conduct heat of the photosensitive sensor to the housing.

7. The camera device according to claim 1, wherein an auto-focus mechanism for driving the lens to perform auto-focusing is provided in the accommodating cavity, and the auto-focus mechanism comprises a second movable part, a second fixing part, a second coil, and a second magnet,
wherein the lens and the second coil are fixed to the second movable part,
the second magnet is fixed to the second fixing part,
the second magnet and the second coil are spaced apart from each other to drive the second movable part to reciprocate along the optical axis direction.

8. The camera device according to claim 1, wherein the lens is a zoom lens.

9. The camera device according to claim 1, wherein the lens is a periscope lens.

10. A portable electronic device, comprising a camera device, wherein the camera device comprises:
a housing having an accommodating cavity;
a lens placed in the accommodating cavity; and
an anti-shake mechanism placed in the accommodating cavity and comprising a first movable part, a first fixing part, a first coil, a first magnet, a filter, and a photosensitive sensor,
wherein the first coil, the filter and the photosensitive sensor are fixed to the first movable part,
the first magnet is fixed to the first fixing part, and
the first magnet and the first coil are spaced apart from each other to drive the first movable part to reciprocate inn a plane orthogonal to an optical axis direction;
a first protrusion protrudes from a backlight side of the first movable part in the optical axis direction, and a first groove is recessed on one end surface of the first protrusion away from the first movable part,
a second groove is recessed on a light-receiving side of the first fixing part in the optical axis direction, and the second groove corresponds to the first groove, and
the photosensitive sensor is fixed on the first protrusion, one end of the photosensitive sensor extends into the first groove, and the other end of the photosensitive sensor extends into the second groove.

* * * * *